United States Patent [19]

Kneringer et al.

[11] Patent Number: 5,102,747

[45] Date of Patent: Apr. 7, 1992

[54] HIGH TEMPERATURE-RESISTANT COMPOSITE

[75] Inventors: Gunter Kneringer, Reutte; Nikolaus Reheis, Jerzens; Walter Thalmann, Breitenwang, all of Austria

[73] Assignee: Schwartzkopf Technologies Corporation, New York, N.Y.

[21] Appl. No.: 720,603

[22] Filed: Jun. 25, 1991

[30] Foreign Application Priority Data

Jun. 28, 1990 [AT] Austria .................. 1376/90

[51] Int. Cl.⁵ .................. B32B 15/04; B23K 1/00
[52] U.S. Cl. .................. 428/634; 228/263.12; 228/221; 228/263.21; 428/660; 428/661
[58] Field of Search .............. 428/660, 661, 663, 664, 428/665, 662, 634; 228/263.12, 263.19, 263.21, 221

[56] References Cited

U.S. PATENT DOCUMENTS

| | | | |
|---|---|---|---|
| 3,565,591 | 2/1971 | Canonico et al. | 428/661 |
| 3,691,607 | 9/1972 | Bondley | 428/661 |
| 3,710,170 | 1/1973 | Friedel | 313/330 |
| 3,731,128 | 5/1973 | Haberrecker | 313/60 |
| 4,597,095 | 6/1986 | Akpan | 378/144 |

FOREIGN PATENT DOCUMENTS 1383557  2/1975  United Kingdom .

*Primary Examiner*—Gary P. Straub
*Assistant Examiner*—Valerie A. Lund
*Attorney, Agent, or Firm*—Morgan & Finnegan

[57] ABSTRACT

The invention relates to a high temperature-resistant composite which consists of at least one part of molybdenum or a molybdenum alloy, and at least one part of graphite, which parts are joined together by means of a zirconium solder. A two-ply interlayer, consisting of a 0.01–0.5 mm thick layer of vanadium, and a 0.1–0.5 mm thick layer of tungsten, tantalum or niobium, is arranged between the part of molybdenum or the molybdenum alloy and the zirconium solder. The layer structure substantially prevents the formation of a eutectic between molybdenum or the molybdenum alloy and the zirconium solder, thereby preventing the reduction of the maximum permissible use temperature of the composite.

11 Claims, No Drawings

HIGH TEMPERATURE-RESISTANT COMPOSITE

FIELD OF THE INVENTION

The invention relates to a high temperature-resistant composite consisting of at least one part of molybdenum or a molybdenum alloy, and at least one part of graphite, which parts are joined together by means of a zirconium solder.

BACKGROUND

For a number of high-temperature applications, the use of composite materials formed from graphite and high-melting metals has gained acceptance in place of materials comprised solely of high-melting metals. These composite materials are distinguished, in particular, by an improved heat storage capacity and a lower density.

The deciding factor for the usefulness of composite materials of graphite and high-melting metals is a good, high temperature-resistant joint between the parts of graphite and the high-melting metal. Moreover, adequate adhesion and long-term stability, as a result of the suppression of carbon diffusion from the graphite part into the metal part, are also equally important. Due to its good wetting properties and its comparatively low price, zirconium, having a melting point of about 1850° C., has proven to be suitable in many applications as a solder for joining high-melting metals and graphite.

When a composite is produced from molybdenum or a molybdenum alloy and graphite, the zirconium solder normally forms a eutectic with the molybdenum. This eutectic typically has a melting point of about 1520° C. For safety reasons, the temperature at which the composite is used should be at least 150° C. below the melting point of the solder. Thus, the use of the composite is unfortunately restricted up to a temperature of about 1350° C. For certain applications, this maximum use temperature is not sufficient.

DE-B 2,115,896, U.S. Pat. No. 4,597,095, DE-B 1,951,383 and DE-B 2,118,425 variously describe composite rotary X-ray tube anodes having a part consisting, for example, of molybdenum or a molybdenum alloy, which part is soldered to one or more parts of graphite. The solder material used is, for example, zirconium or a zirconium alloy. In addition, these references variously disclose interlayers arranged between the graphite and metal parts and the solder material.

In DE-B 2,115,896, no interlayers are provided between the parts to be soldered and the solder material itself, so that the above-mentioned problems with respect to the formation of a eutectic with a reduced melting point arise.

In U.S. Pat. No. 4,597,095, a layer of a non-carbide forming material, such as platinum, palladium or rhodium, is provided between the graphite part and the solder material. Although this interlayer prevents the formation of a zirconium carbide it does not prevent the formation of a eutectic between the molybdenum and zirconium. Thus, this approach suffers the above-mentioned disadvantages.

In DE-B 1,951,383, the soldering surfaces of the graphite parts are selectively provided with a layer of zirconium carbide, tantalum carbide or hafnium carbide before the soldering step. This embodiment, however, does not prevent the formation of a eutectic between molybdenum and zirconium.

In DE-B 2,118,425, an interlayer of tantalum and/or tungsten is provided between the molybdenum part and the solder. The thickness of this interlayer lies in the range between 0.1 and 1 mm, and it is pointed out that the limits indicated are not critical. This interlayer does prevent, to an extent, the formation of a eutectic between molybdenum and zirconium. However, the interlayer according to the reference is unable to relieve thermal stresses which arise during the soldering temperature because of the different thermal expansion of molybdenum and graphite. Thus, cracks can form in the solder material.

It is therefore an object of the present invention to provide a composite material of molybdenum or a molybdenum alloy and graphite, which is suitable for use with temperatures exceeding 1350° C., but which also allows the use of zirconium as the solder material.

SUMMARY OF THE INVENTION

These and other objects are achieved by providing a composite material according to the invention. A two-ply interlayer, consisting of a first ply of vanadium having a thickness in the range of 0.01–0.5 mm, and a second ply of tungsten, tantalum or niobium, having a thickness in the range of 0.1–0.5 mm, is arranged between the part of molybdenum or the molybdenum alloy and the zirconium solder. The interlayer structure is arranged starting from the part of molybdenum or of the molybdenum alloy.

This interlayer structure, according to the invention, reliably prevents the formation of a eutectic between the molybdenum or the molybdenum alloy and the zirconium solder, which, as explained, reduces the maximum permissible use temperature. In addition, the layer structure according to the invention enhances the ductility of the solder layer, facilitating the relief of thermal stresses caused in the metal by the soldering process, thereby significantly reducing the formation of cracks in the solder material that results from the different thermal expansions of molybdenum or a molybdenum alloy and graphite.

Another important factor according to the invention is that the layer thicknesses of the individual plies of the interlayer are mutually matched within the indicated range of layer thicknesses. Another result of the layer structure according to the invention is that the composite can be produced by a layered arrangement of the individual plies of the interlayer and of the solder material, in the form of foils arranged between the part of molybdenum and the graphite. In this arrangement, the soldering of the layered structure occurs in a single soldering step.

DETAILED DESCRIPTION OF PREFERRED EMBODIMENTS

A particularly advantageous composite according to the invention occurs when the interlayer consists of a first ply of vanadium having a thickness in the range of 0.01–0.5 mm and a second ply of tantalum having a thickness in the range of 0.2–0.5 mm. With such an interlayer, a use temperature of the composite up to about 1600° C. is achieved.

This preferred embodiment of the composite according to the invention is preferably produced by arranging the individual plies of the interlayer and the zirconium solder in the form of foils on top of each other, between the part of molybdenum or a molybdenum alloy and the graphite part, and effecting the soldering in one step in a high-vacuum soldering furnace at temperatures between 1740° C. and 1790° C.

In a further advantageous embodiment of the invention, the interlayer consists of a first ply of vanadium having a thickness in the range of 0.01–0.5 mm, and a second ply of tungsten having a thickness in the range of 0.1–0.5 mm. With this interlayer, it is possible to use the composite at temperatures up to about 1500° C. Moreover, in this embodiment of the interlayer, it has proven to be advantageous to use a zirconium solder containing 5–20% by weight of niobium, instead of a pure zirconium solder.

For producing this composite according to the invention, the individual plies of the interlayer and the zirconium solder are likewise arranged in the form of foils on top of each other between the part of molybdenum or molybdenum alloy and the graphite part. The soldering is effected in one step in a high-vacuum soldering furnace at temperatures between 1660° C. and 1710° C.

In addition, it has been found that the molybdenum alloy TZM [titanium-zirconium-molybdenum] has proven to be particularly suitable for composite materials produced according to the invention.

The invention is explained in more detail below by reference to examples.

EXAMPLE 1

To produce a composite according to the invention, a disk-shaped graphite part of 100 mm diameter and 10 mm thickness was cleaned in an ultrasonic bath. A disk-shaped TZM part of the same dimensions was likewise cleaned in an ultrasonic bath. For soldering the two parts, the graphite part was placed upon a dais, with its soldering surface pointing upwards. A 0.2 mm thick foil of zirconium solder containing 10% by weight of niobium was placed upon the graphite part, followed by a 0.2 mm thick W foil and a 0.05 mm thick V foil. Finally, the TZM part was placed upon the V foil. This layered structure was introduced into a high-temperature, high-vacuum soldering furnace. After evacuation, the soldering furnace was brought to a temperature of about 1700° C. in the course of 20 minutes and then held for five minutes at this temperature. The furnace was then cooled to room temperature in a vacuum.

The composite was non-destructively tested by ultrasonics. The soldered joint did not show any cracks or cavities.

EXAMPLE 2

A composite was produced as in Example 1, differing, however, in that the joint, starting from the graphite part, consisted of a 0.2 mm thick Zr foil, a 0.3 mm thick Ta foil, a 0.05 mm thick V foil, and finally the TZM part. Soldering was effected as in Example 1 at a soldering temperature of 1760° C.

The examples represent particularly advantageous embodiments, but the invention is in no way restricted to these embodiments. It is thus conceivable, for example, to apply the individual plies of the interlayer and perhaps also the solder by coating processes, such as CVD processes or plasma spraying, to the parts to be joined. Likewise, the indicated layer thickness of the individual plies of the interlayer and of the solder may be varied within relatively wide ranges.

We claim:

1. A high temperature-resistant composite material, comprising:
   at least one part from the group consisting of molybdenum or a molybdenum alloy, and;
   at least one part of graphite, wherein said parts are joined by means of a zirconium solder, said composite further comprising a two-ply interlayer arranged between the part of molybdenum or the molybdenum alloy and said zirconium solder, wherein said two-ply interlayer comprises, starting from the part of molybdenum or a molybdenum alloy, a first ply of vanadium having a thickness in the range 0.01–0.5 mm and a second ply from the group consisting of tungsten, tantalum or niobium having a thickness in the range of 0.1–0.5 mm.

2. The composite as claimed in claim 1, wherein said interlayer comprises a first ply of vanadium having a thickness in the range of 0.01–0.5 mm and a second ply of tantalum having a thickness in the range of 0.2–0.5 mm.

3. The composite as claimed in claim 1, wherein said interlayer comprises a first ply of vanadium having a thickness in the range of 0.01–0.5 mm and a second ply of tungsten having a thickness in the range of 0.1–0.5 mm.

4. The composite as claimed in claim 3, wherein said zirconium solder comprises niobium in the range of 5–20% by weight of said solder.

5. The composite of claim 1, wherein said part of a molybdenum alloy comprises TZM.

6. The composite of claim 2, wherein said part of a molybdenum alloy comprises TZM.

7. The composite of claim 3, wherein said part of a molybdenum alloy comprises TZM.

8. The composite of claim 4, wherein said part of a molybdenum alloy comprises TZM.

9. A process for producing a composite comprising
   at least one part from the group consisting of molybdenum or a molybdenum alloy, and;
   at least one part of graphite, wherein said parts are joined by means of a zirconium solder, said composite further comprising a two-ply interlayer arranged between the part of molybdenum or the molybdenum alloy and said zirconium solder, wherein said two-ply interlayer comprises, starting from the part of molybdenum or a molybdenum alloy, a first ply of vanadium having a thickness in the range 0.01–0.5 mm an second ply of tantalum having a thickness in the range of 0.2–0.5 mm comprising the steps of:
   arranging the individual plies of said interlayer and said zirconium solder in the form of foils on top of each other between the part from the group consisting of molybdenum or a molybdenum alloy and the graphite part; and
   soldering the composite in one step in a high-vacuum furnace at temperatures in the range of 1740° C. and 1790° C.

10. A process for producing a composite comprising:
    at least one part from the group consisting of molybdenum or a molybdenum alloy, and;
    at least one part of graphite, wherein said parts are joined by means of a zirconium solder, said composite further comprising a two-ply interlayer arranged between the part of molybdenum or the molybdenum alloy and said zirconium solder, wherein said two-ply interlayer comprises, starting from the part of molybdenum or a molybdenum alloy, a first ply of vanadium having a thickness in the range 0.01–0.5 mm and a second ply of tungsten having a thickness in the range of 0.1–0.5 mm comprising the steps of:
  arranging the individual plies of the interlayer and the zirconium solder in the form of foils on top of each other between the part from the group consisting of molybdenum or a molybdenum alloy and the graphite part, and;
  soldering the composite in one step in a high vacuum furnace at temperatures in the range of 1660° C. and 1710° C.

11. A process for producing a composite comprising:
at least one part from the group consisting of molybdenum or a molybdenum alloy, and;
at least one part of graphite, wherein said parts are joined by means of a zirconium solder, said composite further comprising a two-ply interlayer arranged between the part of molybdenum or the molybdenum alloy and said zirconium solder, wherein said two-ply interlayer comprises, starting from the part of molybdenum or a molybdenum alloy, a first ply of vanadium having a thickness in the range of 0.01–0.5 mm and a second ply of tungsten having a thickness in the range of 0.1–0.5 mm, and
wherein said zirconium solder comprises niobium in the range of 5–20% by weight of said solder comprising the steps of:
  arranging the individual plies of the interlayer and the zirconium solder in the form of foils on top of each other between the part from the group consisting of molybdenum or a molybdenum alloy and the graphite part, and;
  soldering the composite in one step in a high vacuum furnace at temperatures in the range of 1660° C. and 1710° C.

* * * * *